S. TATLOW.
VEHICLE AXLE AND WHEEL MOUNTING.
APPLICATION FILED FEB. 13, 1914.
1,157,061.
Patented Oct. 19, 1915.
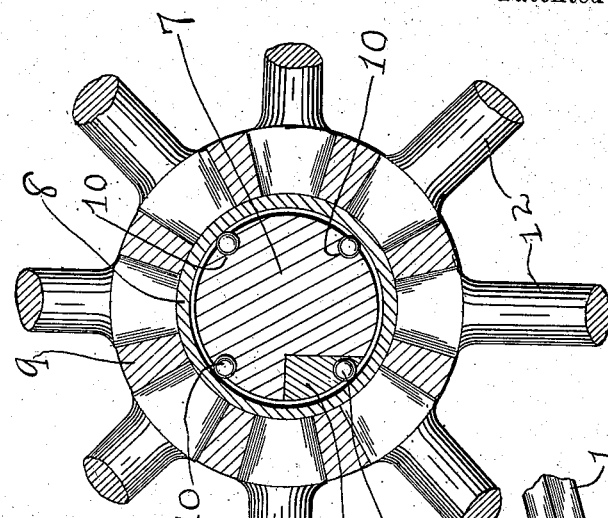
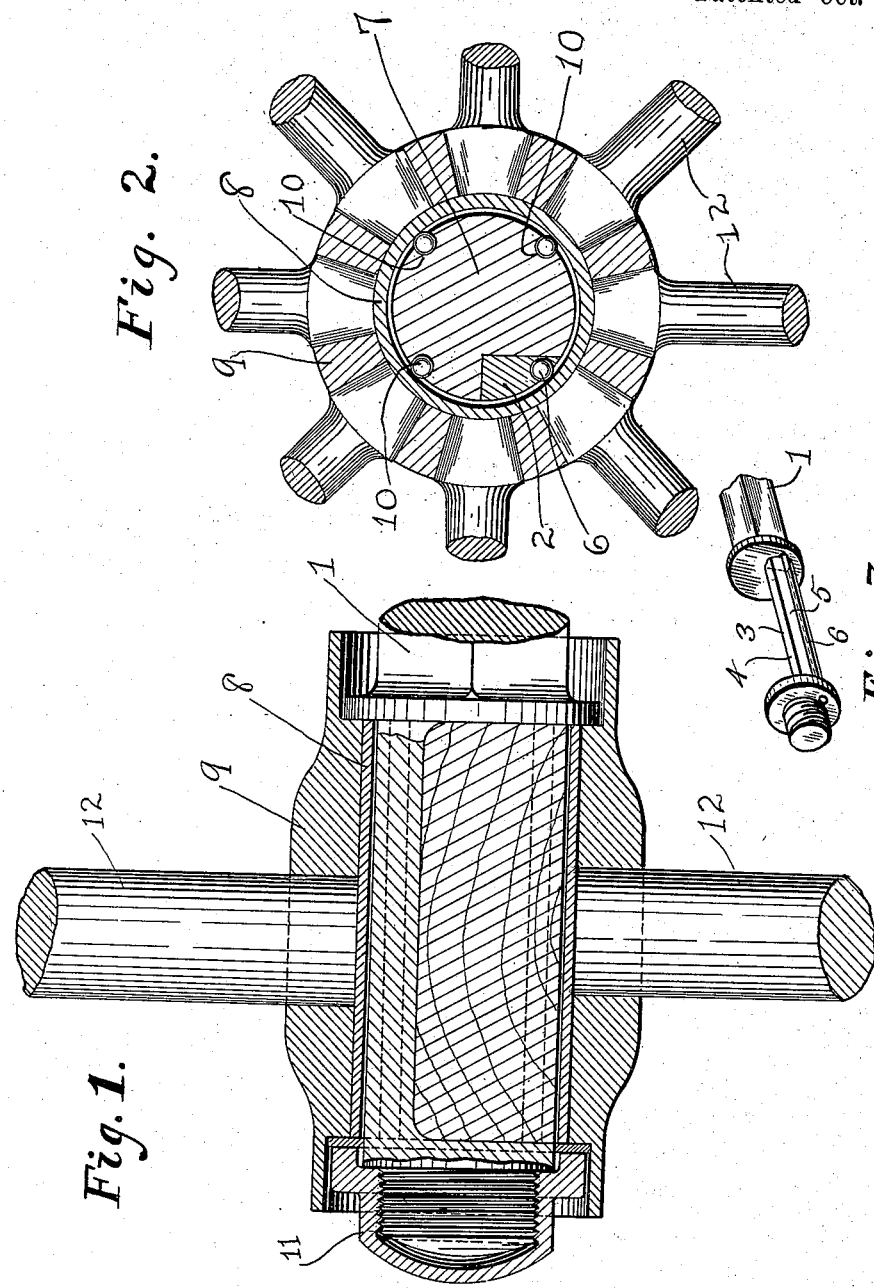
Witnesses
Inventor
SAMUEL TATLOW
By
Attorney
COLUMBIA PLANOGRAPH CO., WASHINGTON, D. C.

UNITED STATES PATENT OFFICE.

SAMUEL TATLOW, OF ST. CLOUD, FLORIDA.

VEHICLE AXLE AND WHEEL-MOUNTING.

1,157,061.     Specification of Letters Patent.     Patented Oct. 19, 1915.

Application filed February 13, 1914. Serial No. 818,520.

*To all whom it may concern:*

Be it known that I, SAMUEL TATLOW, a citizen of the United States, residing at St. Cloud, in the county of Osceola and State of Florida, have invented certain new and useful Improvements in Vehicle Axles and Wheel-Mountings; and I do hereby declare the following to be a full, clear, and exact description of the invention, such as will enable others skilled in the art to which it appertains to make and use the same.

This invention relates to vehicle axles and wheel mountings, and the principal object of the invention is to provide an axle having a spindle composed of an integral portion of the axle, and a wooden block or dummy forming the balance of the spindle, and roller bearings for said spindle.

Another object of the invention is to provide a compound spindle for axles in which a portion of the spindle is formed of metal and integral with the axle, and the balance of the spindle is formed of wood which can be removed when worn away and which will be provided with anti-frictional bearings.

These and other objects may be attained by means of the construction illustrated in the accompanying drawings, in which, Figure 1 is a horizontal section through the hub and spindle taken longitudinally of the axle, Fig. 2 is a vertical section through the hub taken at right angles to Fig. 1, and Fig. 3 is a detail perspective view of the spindle and a portion of the axle.

Referring to the drawings, the numeral 1 designates the axle to be of any desired shape in cross-section, and projecting from the end of the axle 1 is a spindle designated as an entirety by the numeral 2, said spindle being connected to the axle 1 in front of the center or axis of said axle, and below the horizontal center of said axle. The spindle 2 is provided with a flat side 3, a flat upper surface 4, and a curved outer surface 5.

A roller 6 is mounted in the spindle 2, and extends the entire length thereof. A wooden dummy or plug 7 extends the entire length of the spindle 2 and is formed to complete the circle of the spindle, said dummy or block being loosely mounted in the sleeve 8 of the hub 9. Mounted in the dummy 7 are rollers 10. An ordinary cap nut 11 holds the hub of the wheel on the spindle and dummy. The spokes are indicated by 12.

The spindle 2 at its outer end is provided with a reduced portion having a threaded boss thereon to receive the cap 11. The wooden dummy fits between the inner and outer heads of the spindle and can be readily removed and replaced by a new one when it becomes worn. Moreover, the wooden dummy will absorb a large quantity of grease or lubricant and when provided with the roller bearings, the friction between the sleeve 8 of the hub and the spindle and dummy is materially reduced.

Various changes in details of construction may be resorted to without departing from the spirit and scope of the invention as defined in the claim.

What is claimed is:—

The hereindescribed vehicle axle and wheel mounting comprising an axle having an integral spindle projecting from the end thereof, said spindle being disposed in a plane parallel to the major axis of the axle and below the horizontal center thereof, in combination with a dummy fitted to the spindle within a hub, said dummy being formed of wood and filling the space within the hub not occupied by the spindle, and roller bearings on said spindle and dummy.

In testimony whereof I affix my signature in presence of two witnesses.

SAMUEL TATLOW.

Witnesses:
EUGENE SCHOFIELD,
L. W. FARRIS.

Copies of this patent may be obtained for five cents each, by addressing the "Commissioner of Patents, Washington, D. C."